United States Patent [19]
Grobbelaar

[11] Patent Number: 4,888,483
[45] Date of Patent: Dec. 19, 1989

[54] DIAMOND RADIATION PROBE

[76] Inventor: Jacobus H. Grobbelaar, 18 Truro Road New Redruth, Alberton, Tvl., South Africa

[21] Appl. No.: 263,011

[22] Filed: Oct. 26, 1988

[30] Foreign Application Priority Data

Oct. 27, 1987 [ZA] South Africa .................. 87/8050

[51] Int. Cl.⁴ .................. G01J 1/00; G01T 1/00; G01T 1/22; G01T 1/24
[52] U.S. Cl. .................. 250/336.1; 250/370.01; 250/370.07
[58] Field of Search .......... 250/336.1, 363.04, 363.05, 250/364, 370.01, 370.03, 370.05, 370.07, 371

[56] References Cited

U.S. PATENT DOCUMENTS

| | | | |
|---|---|---|---|
| 3,383,567 | 5/1968 | King et al. | 357/10 |
| 3,638,022 | 1/1972 | Kozlov | 250/370.01 |
| 3,665,193 | 5/1972 | Kozlov et al. | 357/29 |
| 3,668,400 | 6/1972 | Kozlov | 250/370.01 |
| 4,751,390 | 6/1988 | Koop | 250/370.07 |
| 4,767,929 | 8/1988 | Valentine | 250/370.07 |
| 4,833,328 | 5/1989 | Prins et al. | 250/370.01 |

*Primary Examiner*—Janice A. Howell
*Assistant Examiner*—J. Eisenberg
*Attorney, Agent, or Firm*—Scully, Scott, Murphy & Presser

[57] ABSTRACT

The invention provides apparatus for measuring nuclear radiation. The apparatus includes a probe which comprises a synthetic diamond and a FET pre-amplifier. A DC bias voltage is applied across the diamond and the pre-amplifier amplifies pulse or conduction signals from the diamond due to incident radiation. The pre-amplifier provides a first output having only an AC component, and a second output having both an AC and a DC component. A DC feedback stage applies a feedback signal to the input of the pre-amplifier to improve its dynamic range.

11 Claims, 1 Drawing Sheet

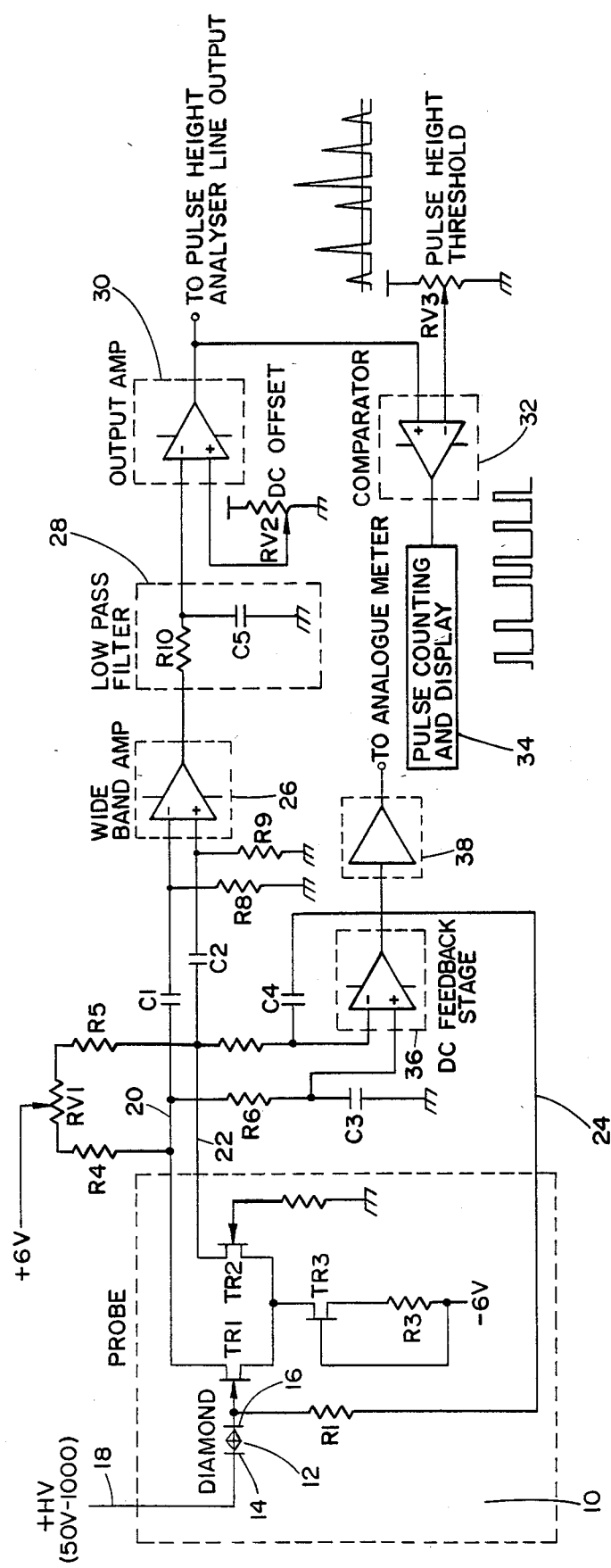

DIAMOND RADIATION PROBE

BACKGROUND TO THE INVENTION

This invention relates to apparatus for measuring nuclear radiation which includes a probe comprising a synthetic diamond.

Diamonds have been found to have several advantages when used as detectors of nuclear radiation. These advantages include their small physical size and their ability to work over a wide temperature range. Diamonds are also tissue equivalent, which makes their use in the medical field attractive. Diamonds may be used in a conduction mode for high levels of radiation, or in a pulse counting mode for both high and low levels of radiation.

Due to the extremely high impedance of diamonds, an amplifier having a very high input impedance is required to amplify pulses or a conduction signal from the diamond. This generally requires the use of field-effect transistors (FETS). For use in the conduction mode, the amplifier must have very low DC drift. The amplifier should not saturate at high DC input levels, when the diamond is exposed to high dose rates in the conduction mode. The amplifier should further be capable of coping with pulses having a fast rise time in the pulse counting mode.

SUMMARY OF THE INVENTION

According to the invention apparatus for measuring nuclear radiation comprises a probe which includes a counting diamond to which a pair of electrical contacts are attached, and a pre-amplifier which comprises at least one field-effect transistor, the contacts on the diamond being connected to the input of the pre-amplifier, and a DC bias voltage being applied across the diamond in use, the pre-amplifier including filter means for separating the output of the pre-amplifier into a first signal having only an AC component and a second signal having both a DC and an AC component.

Preferably, the preamplifier comprises a pair of field-effect transistors in a differential configuration.

The probe may be connected to a signal processing circuit which includes a first amplifier stage for amplifying the first signal and applying it to a pulse height analyzer or a pulse counter, the first signal representing a pulse-mode signal of the diamond.

The signal processing circuit may further include a second amplifier stage for amplifying the second signal which is adapted to reject common mode components of the second signal and to apply it to means for measuring the amplitude thereof, the second signal representing a conduction-mode signal of the diamond.

The second amplifier stage may be adapted to apply a DC feedback signal to the input of the pre-amplifier.

The diamond preferably has ion-implanted regions on its surface to which the contacts are attached, to provide substantially linear voltage/current contact characteristics.

BRIEF DESCRIPTION OF THE DRAWING

The drawing is a schematic circuit diagram of a probe and a signal processing circuit for measuring nuclear radiation according to the invention.

DESCRIPTION OF AN EMBODIMENT

Referring to the drawing, a probe 10 for measuring nuclear radiation includes a counting diamond 12 and a pre-amplifer comprising two field-effect transistors (FETS) TR1 and TR2 in a differential configuration. The diamond 12 can be a selected natural diamond, but is preferably a low-nitrogen synthetic diamond. The nitrogen impurity concentration of the diamond is preferably 60 ppm or less, as measured by electron spin resonance (ESR) techniques. The diamond has an ion-implanted zone on each of a pair of faces, to which are attached electrical contacts 14 and 16. The use of ion implanted zones allows contacts to be obtained which have a substantially linear voltage/current characteristic. The contacts 14 and 16 can be metallic, or can be formed by using silver loaded epoxy adhesive to attach conductors to the ion implanted zones. The contact 16 is connected to the gate of the FET TR1 while the contact 14 is connected via a lead 18 to a DC bias voltage source having a voltage in the range of 50 to 1000 volts. A third FET TR3 is provided, in a constant current source configuration, to control the standing current of the transistors TR1 and TR2. DC current is supplied to the pre-amplifier via two leads 20 and 22, which also serve as output leads. A fourth lead 24 supplies a DC feedback signal to the pre-amplifier as described below. The number of components in the probe 10 is reduced by locating the drain resistors R4 and R5, and a DC off-set adjustment resistor RV1 remotely from the probe, which can conveniently be pencil-shaped and compact.

The output of the pre-amplifier on the leads 20 and 22 has an AC and a DC component. A pair of capacitors C1 and C2 act as high pass filters at the input of a wide band amplifier 26 based on an NE592 integrated circuit. The amplifier 26 amplifies the AC component of the pre-amplifier output (i.e. the pulse output of the pre-amplifier) and applies it to a simple RC low pass filter 28. The output of the filter 28 is buffered by an output amplifier 30, which provides an output to a pulse height analyzer or other signal processing equipment, and to a pulse height comparator 32, which provides signals to a pulse counter 34. The pulses correspond to pulse-mode signals of the diamond.

The unfiltered output of the pre-amplifier is fed to an amplifier stage comprising a common mode rejection stage 36 and a DC buffer amplifier 38, the output of which can be fed to an analogue meter or another indicating device such as a chart recorder to provide a display of the conduction mode signal from the diamond. The common mode rejection stage operates as a DC feedback stage, with the feedback being applied via the resistor R1, and has a very high DC gain. This stage includes a low pass filter consisting of two resistors R6 and R7 and respective capacitors C3 and C4. In this configuration the composite amplifier (comprising the preamplifier based on the transistors TR1 and TR2, and the DC feedback stage) acts as a current-to-voltage converter at low frequencies. The tiny diamond current is effectively converted to an easily measured voltage.

The output of the common mode rejection stage 36 is fed back via the lead 24 and via a resistor R1 to the gate of the FET TR1 of the pre-amplifier. This sets the DC gain of the pre-amplifier and ensures that when high levels of radiation are measured, the input stage will not saturate. The DC feedback signal is derived from the DC component of the pre-amplifier output.

The DC input voltage at the gate of the transistor is maintained close to ground potential, ensuring that the pre-amplifier has a wide dynamic range. The preamplifier can thus cope with both pulse and conduction mode signals. This allows high or low radiation intensities to be measured. It also ensures that the output voltage of the common mode rejection stage is proportional to the current in the diamond, so that the exact current through the diamond is relatively easily measured. The measured output voltage corresponds to the conduction-mode signal of the diamond.

I claim:

1. Apparatus for measuring nuclear radiation comprising a probe which includes a counting diamond to which a pair of electrical contacts are attached, and a pre-amplifier which comprises at least one field-effect transistor, the contacts on the diamond being connected to the input of the pre-amplifier and a DC bias voltage being applied across the diamond in use, the pre-amplifier including filter means for separating the output of the pre-amplifier into a first signal having only an AC component and a second signal having both a DC and and AC component.

2. Apparatus according to claim 1 wherein the pre-amplifier comprises a pair of field-effect transistors in a differential configuration.

3. Apparatus according to claim 1 wherein the probe is connected to a signal processing circuit which includes a first amplifier stage for amplifying the first signal and applying it to a pulse height analyzer or a pulse counter, the first signal representing a pulse-mode signal of the diamond.

4. Apparatus according to claim 3 wherein the signal processing circuit further includes a second amplifier stage for amplifying the second signal which is adapted to reject common mode components of the second signal and to apply it to means for measuring the amplitude thereof, the second signal representing a conduction-mode signal of the diamond.

5. Apparatus according to claim 4 wherein the second amplifier stage is adapted to apply a DC feedback signal to the input of the pre-amplifier.

6. Apparatus according to claim 5 wherein the DC feedback signal is derived from the DC component of the output of the pre-amplifier.

7. Apparatus according to claim 6 wherein the pre-amplifier and the second amplifier stage define, in combination, a current-to-voltage converter which effectively converts a current in the diamond to a measurable voltage.

8. Apparatus according to claim 7 wherein the measurable voltage corresponds to a conduction-mode signal of the diamond.

9. Apparatus according to claim 1 wherein the diamond is a synthetic diamond.

10. Apparatus according to claim 9 wherein the diamond has a nitrogen impurity concentration of 60 ppm or less, as measured by electron spin resonance (ESR) techniques.

11. Apparatus according to claim 1 wherein the diamond has ion-implanted regions on its surface to which the contacts are attached, to provide substantially linear voltage/current contact characteristics.

* * * * *